United States Patent

Runggaldier et al.

[11] Patent Number: 5,825,154
[45] Date of Patent: Oct. 20, 1998

[54] PHASE CONTROL METHOD OF STOPPING A DRIVE SMOOTHLY

[75] Inventors: Diethard Runggaldier, Stegaurach; Johann Seitz, Amberg, both of Germany

[73] Assignee: Siemens Aktiengesellschaft, Munich, Germany

[21] Appl. No.: 682,531
[22] PCT Filed: Jan. 31, 1994
[86] PCT No.: PCT/DE94/00094
§ 371 Date: Sep. 25, 1996
§ 102(e) Date: Sep. 25, 1996
[87] PCT Pub. No.: WO95/20839
PCT Pub. Date: Aug. 8, 1995
[51] Int. Cl.[6] .................................................. H02P 3/18
[52] U.S. Cl. ........................ 318/757; 318/337; 318/365; 318/366; 318/367
[58] Field of Search ................................. 318/365, 757, 318/366, 367, 369, 337

[56] References Cited

U.S. PATENT DOCUMENTS 4,833,386  5/1989  Unsworth ................................ 318/763
4,994,951  2/1991  Iwasa et al. ............................. 363/41
5,008,608  4/1991  Unsworth et al. ...................... 318/729

FOREIGN PATENT DOCUMENTS 30 09 445 A1  9/1981  Germany.
40 05 679 A1  9/1990  Germany.

Primary Examiner—William M. Shoop, Jr.
Assistant Examiner—Kim Lockett
Attorney, Agent, or Firm—Kenyon & Kenyon

[57] ABSTRACT

A method of smoothly stopping pump drives without pressure surges is provided. To accomplish this, the phase control angle between the motor current and the motor voltage is increased according to a linear ramp starting from 0° with the help of an a.c. power controller, where the phase angle decreases and reaches a turning point. If the turning point is detected by observing the phase angle, the phase control is based on this by means of a controller with a predefined linear phase angle reference curve as a function of time. Then the motor rpm does not change abruptly because a rapid change in phase angle is prevented.

7 Claims, 6 Drawing Sheets

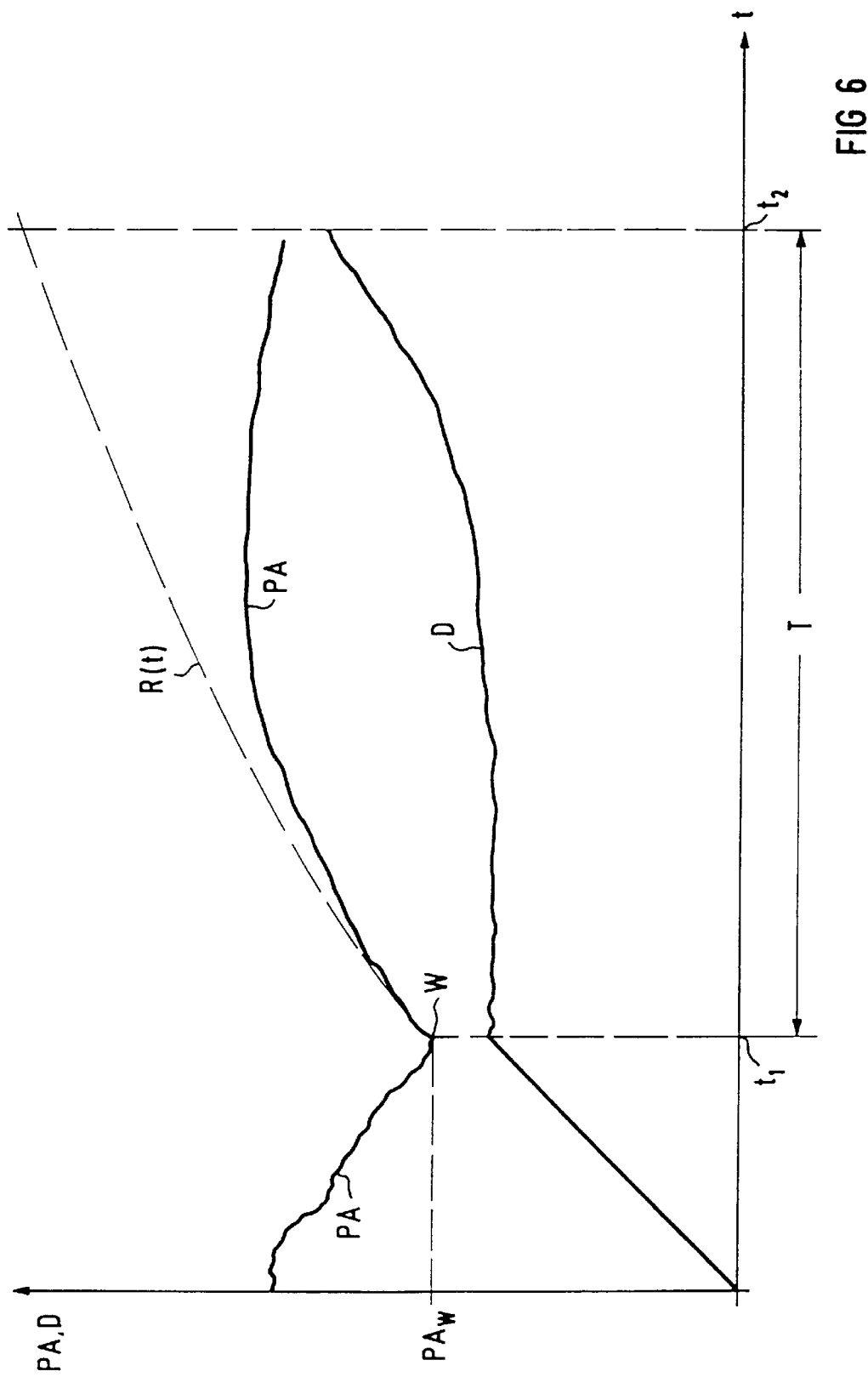

PHASE CONTROL METHOD OF STOPPING A DRIVE SMOOTHLY

FIELD OF THE INVENTION

The present invention relates to a phase control method of stopping a drive smoothly, in particular a pump drive, in accordance with the phase angle between the voltage and the current of the drive motor.

BACKGROUND INFORMATION

There are known phase control methods of stopping and starting a drive smoothly as a function of the phase angle between the motor voltage and the motor current. Smooth stopping makes special demands on the control system. When a pump drive is shut off, it causes knocking in pipeline systems which is also known as "water hammering" and is caused by the abrupt changes in flow. This not only damages the pipeline system but is also disturbing because of the acoustic noise.

An abrupt change in flow occurs especially when the drive of a rotary pump, for example, is shut down directly by opening the respective motor contactor. The following relationship holds between the rpm and flow and between the change in rpm and the change in pressure: the flow is directly proportional to pump rpm, and the change in pressure is directly proportional to the square of the change in rpm.

As FIG. 1 illustrates, in the case of a direct shutdown of a pump drive with a three-phase induction motor, the drive is stopped within a very short period of time because of the load torque curve Pum in which the pump has a high counter-torque. FIG. 1 shows the moment M plotted against the rpm n. Mom is the motor torque, Pum is the load torque, Bm is the accelerating torque, Kim is the breakdown torque and N is the nominal working point. Because of the high counter-torque Pum of the pump, there is a rapid change in rpm n, resulting in an abrupt change in flow and pressure because of the above-mentioned relationships. This leads to a pressure surge known as a water hammer. Any check valves will exacerbate the problem.

FIG. 2 shows a plot of motor current I, motor voltage u and rpm n over time in a direct disconnect.

In the past, various methods have been used as countermeasures.

Mounting an inertial weight on the pump drive makes it possible to prevent the drive from stopping immediately when there is a shutdown. The stored energy of the inertial weight leads to delayed stopping of the pump, so the change in pressure and the change in flow are slowed down. This method is complex mechanically, and additional power is needed for operation.

By using frequency converters, the pump motor can decelerate from its rated speed N according to an rpm ramp. This method is comparatively expensive, especially for higher-powered pumps.

So-called smooth starting devices that operate according to the principle of a 3-phase a.c. power controller are used for turning pump motors on and off. In addition to smooth starting, these devices also permit smooth stopping. Through phase control, the motor terminal voltage is not disconnected suddenly but instead is ramped down, so the motor also stops smoothly.

There are different types of smooth stopping. The simplest type consists of increasing the phase control angle linearly from 0° until the motor has stopped. As FIG. 3 illustrates, if the reduced motor torque drops below the load torque, there is a rapid change in rpm, which in turn causes water hammering in most cases. Another method consists of measuring the motor terminal voltage and ramping it down when stopping. However, additional hardware is needed to measure the motor terminal voltage. One problem here is that the voltage is phase-controlled and furthermore it must be supplied in a potential-free form for control. In a simple solution a time lag that can have a negative effect on the control response occurs due to the measurement and "smoothing" of the motor terminal voltage.

The present phase control method of smoothly stopping is based on the principle of a known smooth starting device according to FIG. 4, as is described in German Published Patent Application 4,005,679. A 3-phase induction motor Mt is connected to the three phases A, B and C of a 3-phase system via a thyristor circuit of anti-parallel thyristors 1A, 1B and 1C, respectively. The six thyristors can be energized by means of a suitable ignition circuit. If the thyristors are "on" after ignition, the current flow stops when the current IA, IB, and IC passes through zero. Phase control is defined as occurring when the thyristors are energized again a predefined period of time after the current stops in a.c. applications. The delay is usually known as the phase angle.

In addition to the above-mentioned circuit of the a.c. power controller and the ignition circuits, the basic design of the smooth starting device also includes detection circuits 3A, 3B, and 3C that display the status of a pair of thyristors. Only the two states "current carrying" and "de-energized" are differentiated, as indicated by the curve IOA, in FIG. 5.

A detection circuit 4 that supplies a line-synchronous signal from the line voltage VAB serves as a synchronizing signal (VOAB). This signal differentiates only between the two states "positive voltage" and "negative voltage" and is derived from the voltage VAB between the two phases A and B according to FIG. 5.

With the help of these signals it is possible to determine the phase angle PA between the motor current and the voltage.

The phase angle PA between the motor voltage and the motor current is determined from a signal such as IOA, which indicates the status of the individual thyristor pairs 1A, 1B and 1C. Specifically, signal IOA indicates the time at which no current passes through thyristor pairs 1A, 1B and 1C. This status is indicated by the trailing edges in the curve IOA, for example, and from the signal VOAB, which is synchronous with the line voltage VAB and indicates in particular when the line voltage is zero. FIG. 5 shows these relationships including the ignition angle control according to the curve labeled as FPA for thyristor pair 1A in phase A.

SUMMARY OF THE INVENTION

An object of the present invention is to provide a method of smoothly stopping pump drives without causing pressure surges, so the pipeline system is not damaged and negative acoustic effects are also largely prevented. This is accomplished with a phase control method of smoothly stopping a drive, specifically a pump drive, in accordance with the phase angle between the voltage and the current of the drive motor. In accordance with this method, the change in phase angle over time is at first negative due to the increase in the phase control angle. The phase angle changes directions at a turning point. Further, starting from the instantaneous phase angle, the phase control angle is regulated using a preset phase-angle reference curve as the input parameter when the turning point is determined with the help of a controller. In this method, no additional hardware is needed in comparison with the conventional control for smooth starting devices with phase control. Only the phase angle between the current and the voltage is needed for this method, and this value is either already available by conventional control methods or it can be easily derived from the available information.

It is especially advantageous if the phase control angle increases linearly until the turning point is detected. Furthermore, it is advantageous if the phase angle reference curve is linear with a positive change in phase angle over time. The increase in phase control angle is preferably in the range of 15° to 20° per second. It is also expedient if the linear increase in the phase angle reference curve over time is in the range of 0.5° to 6° per second. An especially advantageous embodiment of this method is obtained if the phase control angle is controlled in the following steps with the predefined linear phase angle reference curve for the positive change in phase angle over time:

a) the measured phase angle is compared with the phase angle reference at equidistant time increments $\Delta t$;

b) the instantaneous phase angle is sent to the controller as the starting value for the comparison value when the turning point is detected;

c) if the phase angle measured after the time increment $\Delta t$ is greater than the reference at that time, the phase control angle is reduced by a first differential value in comparison with the latest value; otherwise the first differential value is added to the latest value;

d) the comparison value is increased by a second differential value according to the reference at the next time increment $\Delta t$;

e) the steps described above are repeated with the phase angle measured at the next time increment $\Delta t$ and the corresponding comparison value, as long as the resulting new phase control angle is smaller than the largest possible phase control angle.

The slope of the linear phase angle reference curve is preferably adjustable in order to be able to influence the stopping time.

BRIEF DESCRIPTION OF THE DRAWINGS

The present invention will be more apparent from the following detailed description, when taken in conjunction with the accompanying drawings, in which:

FIG. 6 shows a diagram of the phase control angle and the phase angle over time;

FIG. 6 shows the phase control method according to this invention for stopping a pump drive smoothly. When the phase control angle D is controlled according to the lower curve in the diagram, this yields the phase angle PA between the voltage and the current of the drive motor according to the top curve. To stop the pump motor, beginning first with a phase control angle of D=0°, the angle is increased according to a linear ramp, leading to a drop in motor voltage, and the change in phase angle over time, dPA/dt, is negative at first. The phase angle PA is determined in each system period, i.e., at equidistant time increments $\Delta t$, for example, according to the prior art method described above. The curve for the phase angle PA is plotted during the linear increase in the phase control angle D and evaluated. With an appropriate choice of the slope for the linear rise in phase control angle D in the range of 15° to 20° per second, a turning point W is obtained in the curve of phase angle PA. If such a turning point W is detected, this is an indication that the motor is in a state where the pump torque (load torque) exceeds the motor torque if there is a further reduction in voltage, and there is an abrupt drop in rpm which results in water hammering. After this point in time t1, phase control angle D no longer has a linear rise, but instead is influenced by a controller so that phase angle PA increases according to a linear ramp, preferably after the turning point W. FIG. 6 illustrates phase angle PA as it increases according to a phase angle reference curve R(t). As a result, the motor rpm does not change abruptly because the motor voltage is regulated via the phase control angle D. Consequently, a rapid change in phase angle is avoided. As FIG. 6 shows, the measured phase angle PA does not follow the phase angle reference curve R(t) in the present embodiment for physical reasons. In the initial phase after turning point W, phase control angle D is almost constant at first. In other words, the motor voltage is also kept constant, and only later is the voltage reduced by increasing phase control angle D.

A PID controller, for example, whose controlled variable is phase angle PA is used as the controller. The manipulated variable is the phase control angle D for the phase control. The reference value of the controlled variable increases according to the linear ramp R(t) starting from the instantaneous value of the phase angle $PA_w$ on detection of turning point W up to a maximum value. The slope of the linear ramp R(t) is preferably adjustable over the parameter "stopping time."

Figure 1:
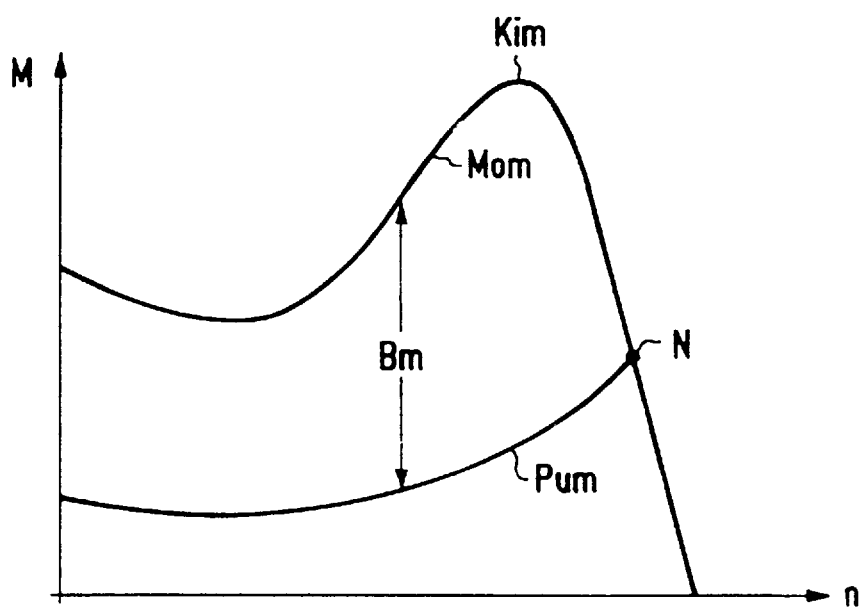
FIG. 1 shows the moment M plotted against the rpm n.
Figure 2:
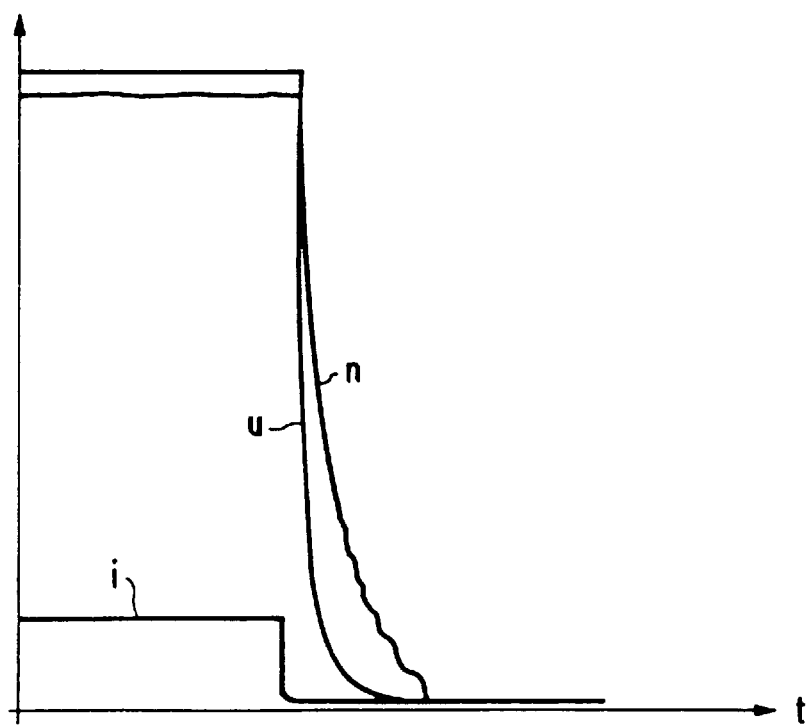
FIG. 2 shows motor current I, motor voltage u, and rpm n plotted against time.
Figure 3:
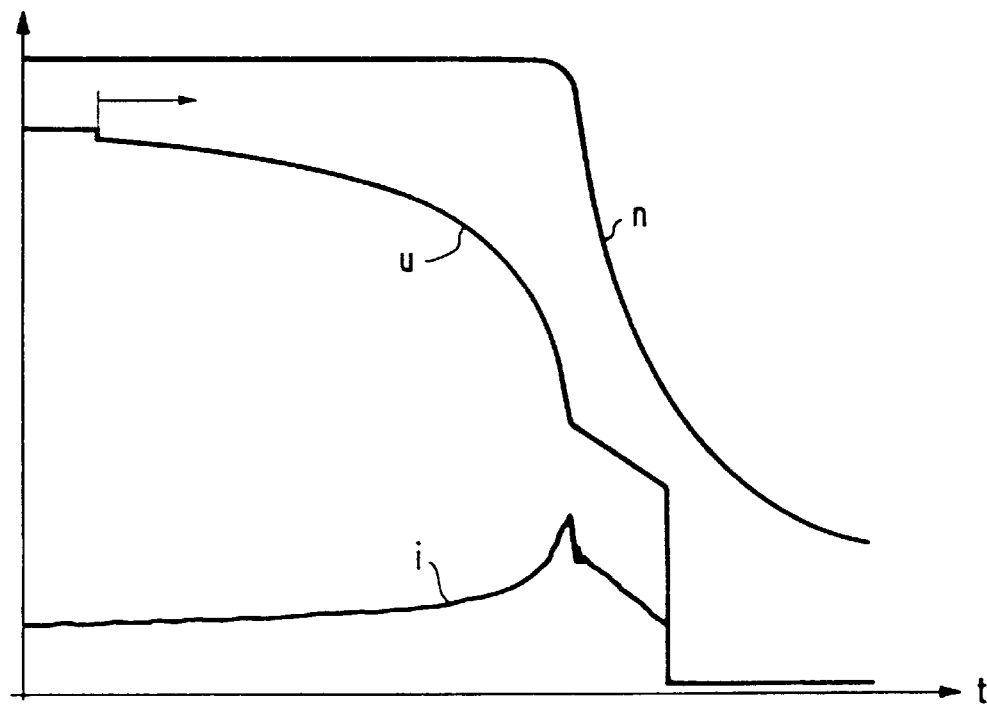
FIG. 3 shows motor current I, motor voltage u, and rpm n plotted against time when the motor torque drops below the load torque.
Figure 5:
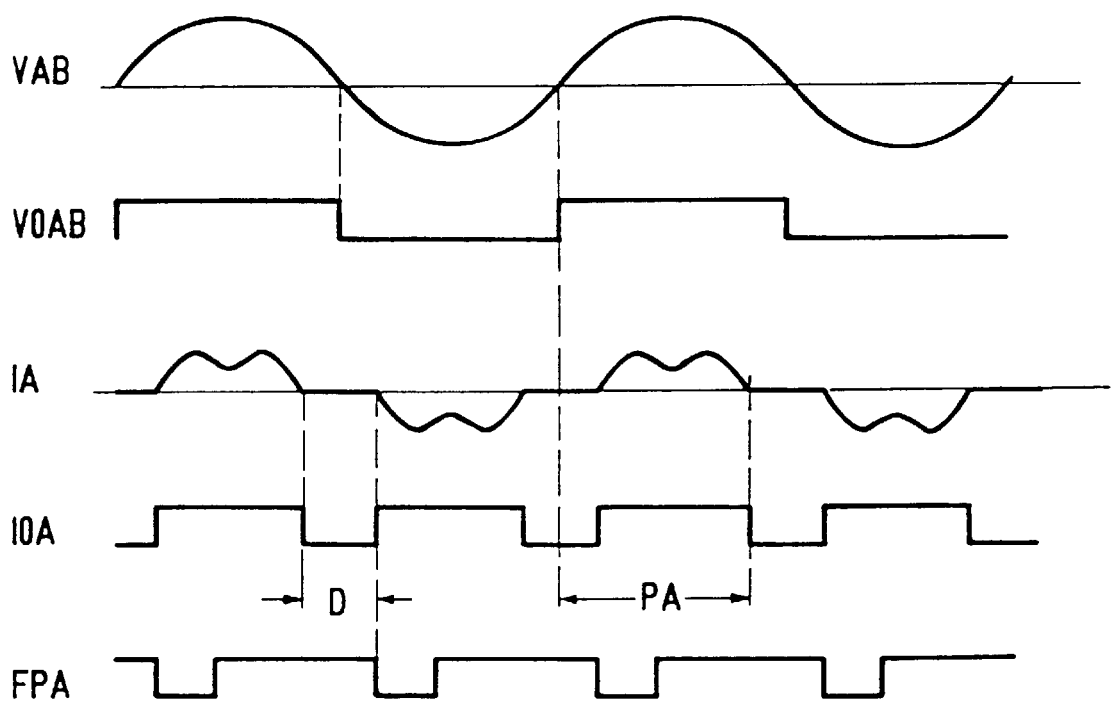
FIG. 5 illustrates the variation over time of various signals in the device of FIG. 4.
Figure 4:
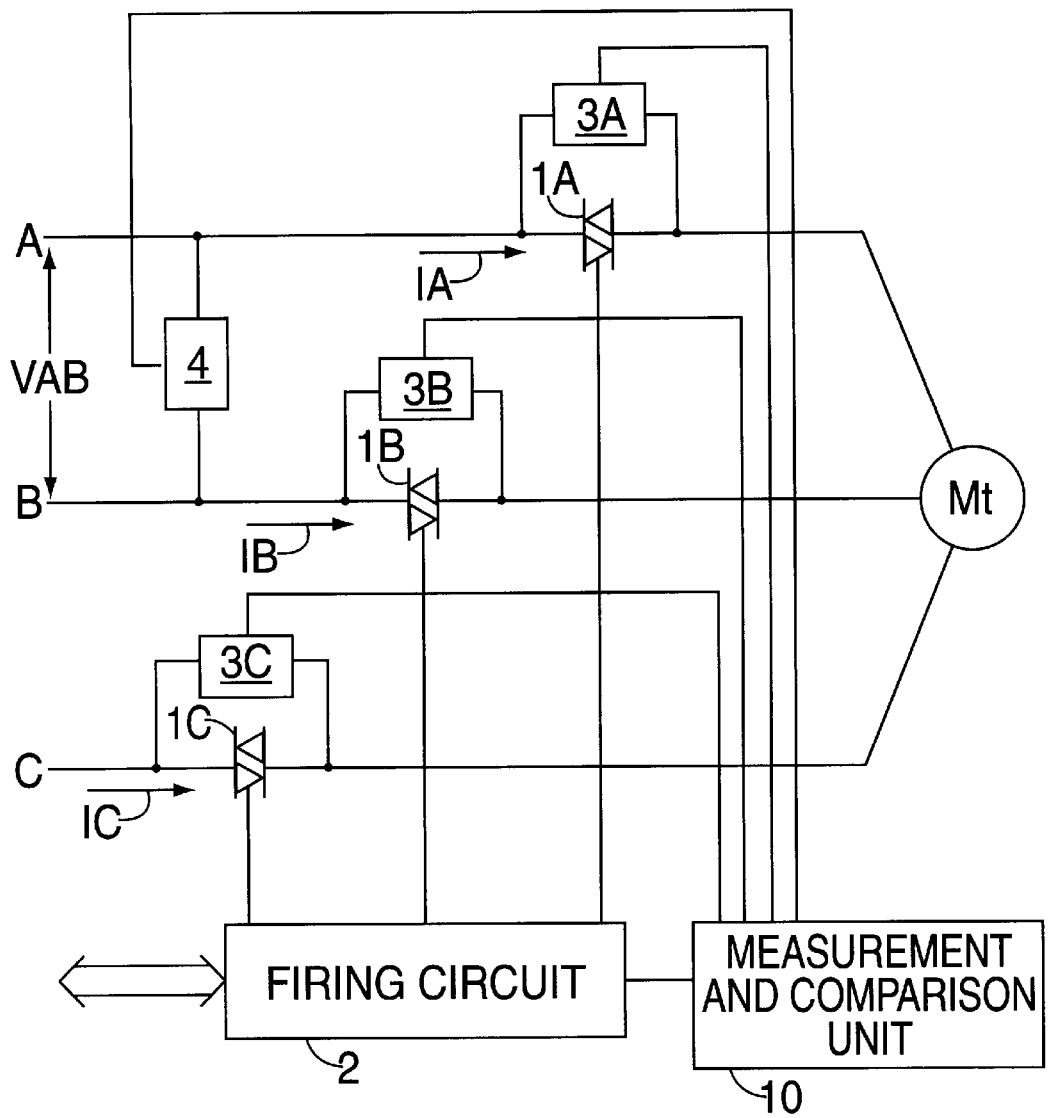
FIG. 4 illustrates a conventional smooth starting device.
Figure 7:
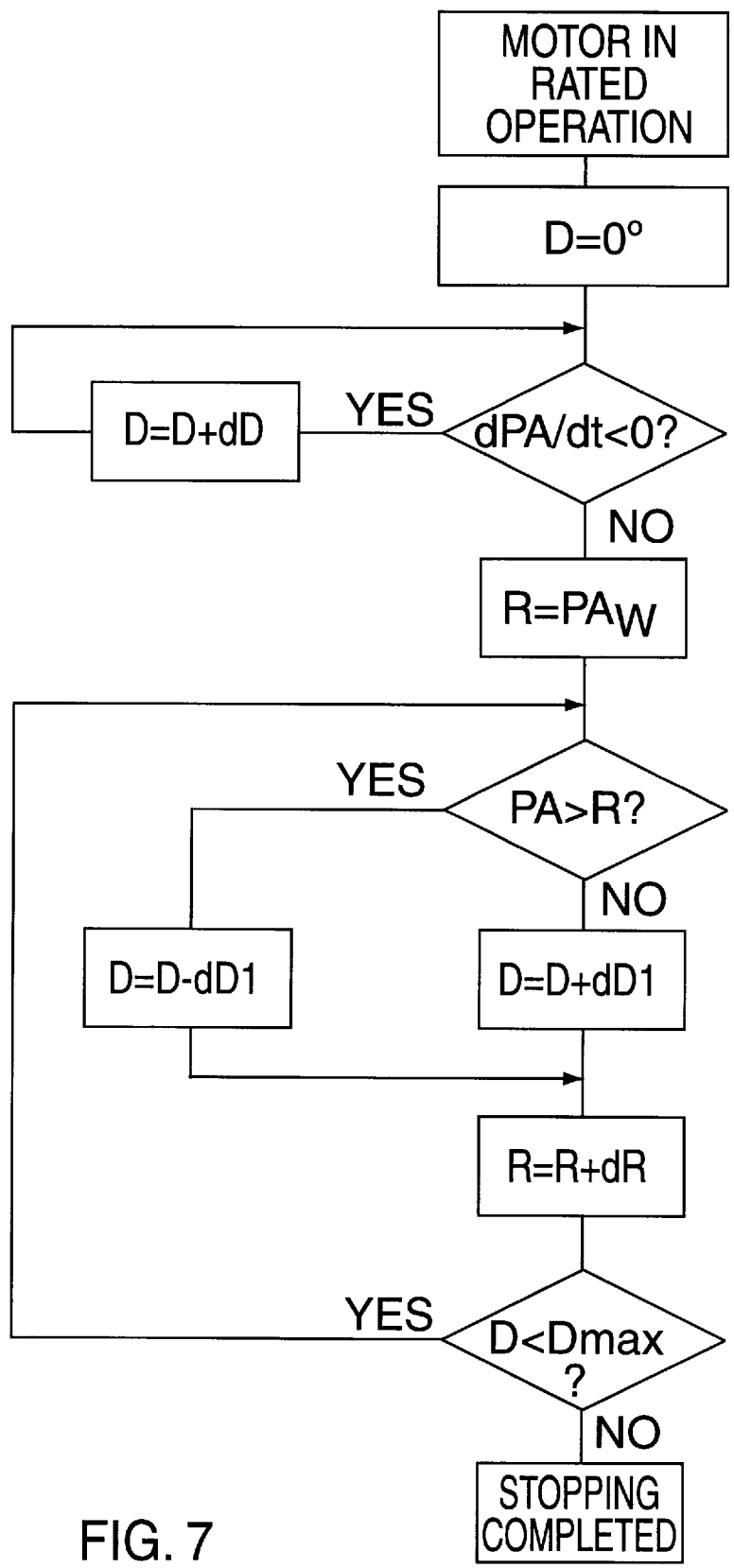
FIG. 7 shows a phase control flow chart.

FIG. 7 shows a flow chart for the phase control according to this invention. According to this flow chart, phase control angle D increases linearly, starting from 0°, which leads to a decrease in the phase angle PA. In other words, it results in a negative change in phase over time, dPA/dt. After each time increment $\Delta t$, in other words, in each system period in the present case, phase angle PA is measured as described initially. A first differential value of the change in phase control dD is calculated for the linear ramp so that the slope is neither too steep, because otherwise the motor breakover point might be skipped, nor is it too small, because otherwise the turning point W could not be detected. If dPA/dt, the change in phase angle over time, is no longer negative, this is an indication that the turning point W has been reached. The corresponding phase angle PA, is the initial reference or the comparison value R for the controller. Starting at this time, the phase control is handled by the controller, which receives the linear phase angle reference curve R(t) as a reference or comparison value. In other words, the phase angle comparison value R is increased in a loop by the change in comparison value dR, which is calculated from the selected stopping time. The change in comparison value dR is obtained from the coordinates $PA_w$ and $t_1$ for the turning point W and the condition that the phase angle should be 120° at the time $t_2=t_1+T$ after the selected stopping time T. Consequently, the change in comparison value dR within one time increment $\Delta t$ is calculated as $dR=[(120°-PA_w)/T]$ ·Δt. Within the loop there is an inquiry as to whether or not the measured phase angle PA is greater than the comparison value R. For the case when PA>R, phase control angle D is reduced by a differential value dD1 in comparison with the latest value. In the embodiment shown, the change dD1 is calculated with a PID controller. However, if phase angle PA is smaller than or equal to the reference R, there is a corresponding increase in phase control angle D by the differential value dD1. Subsequently, the reference R for the phase angle is increased by the change in the comparison value dR and thus the next control step is initiated again until as the largest possible control angle Dmax is achieved. This ends the smooth stopping for the pump drive.

Figure 8:
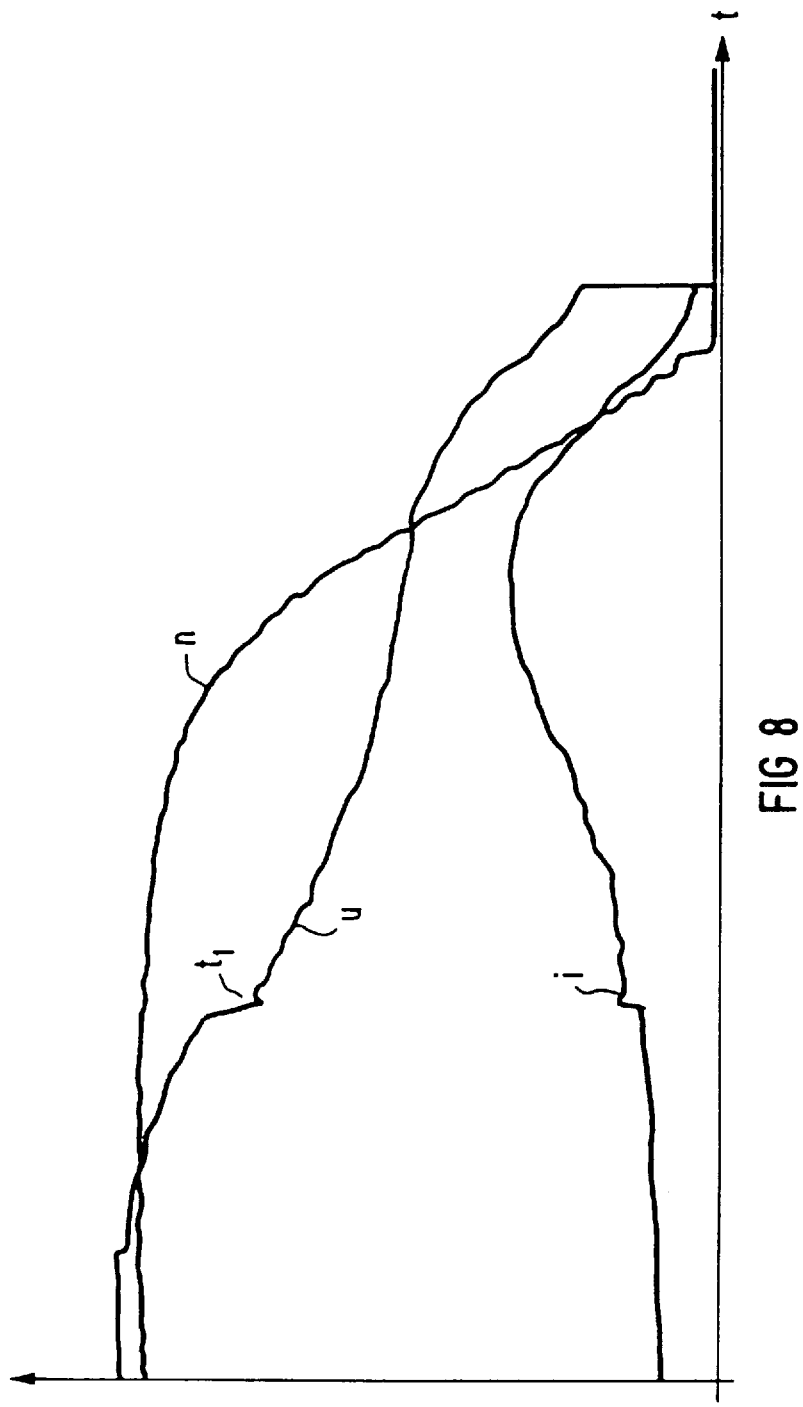
FIG. 8 shows a diagram for stopping a pump by the method according to this invention.

FIG. 8 shows the motor current I, motor voltage u, and motor rpm n over time for smooth stopping of a pump drive by the phase control method according to this invention. An rpm curve without any abrupt dips is achieved by a controlled voltage drop. The rpm n at first drops slowly but continuously, developing into a linear range with a steeper slope. The slope of this linear descending range depends on the preset slope of the linear phase angle reference curve R(t) and can be adjusted through the "stopping time."

What is claimed is:

1. A phase control method for smoothly stopping a pump drive motor in accordance with a phase angle between a voltage and a current of the pump drive motor, comprising the steps of:

a) determining a change in the phase angle over time, the change in the phase angle at first decreasing in magnitude over time, the phase angle decreasing in magnitude due to an increase in a phase control angle;

b) detecting a turning point at which the change in the phase angle begins to increase in magnitude over time;

c) determining an instantaneous phase angle at the turning point; and d) regulating the phase control angle when the turning point is detected, wherein the regulating step occurs under a control of a controller having a preset phase angle reference curve as an input parameter.

2. The phase control method according to claim 1, wherein the phase control angle increases linearly until the turning point is detected.

3. The phase control method according to claim 1, wherein the phase angle reference curve is linear, the phase angle reference curve increasing in magnitude over time.

4. The phase control method according to claim 2, wherein the linear increase in the phase control angle is in a range of 15° to 20° per second.

5. The phase control method according to claim 3, wherein the linear increase in the phase angle reference curve over time is in a range of 0.5° to 6° per second.

6. The phase control method according to claim 1, wherein the step of regulating the phase control angle comprises:

e) comparing the phase angle with the phase angle reference curve at a plurality of equidistant time increments, the phase angle reference curve being initialized to a comparison value equal to the instantaneous phase angle when the turning point is detected;

f) reducing the phase control angle by a first differential value when the phase angle is greater than the phase angle reference curve;

g) increasing the phase control angle by the first differential value when the phase angle is no more than the phase angle reference curve;

h) increasing the comparison value by a second differential value at a next time increment in accordance with the phase angle reference curve; and I) repeating steps e) through h) while the phase control angle is smaller than a predetermined maximum value.

7. The phase control method according to claim 3, wherein a slope of the linear phase angle reference curve is adjustable.

* * * * *